Figure 9:
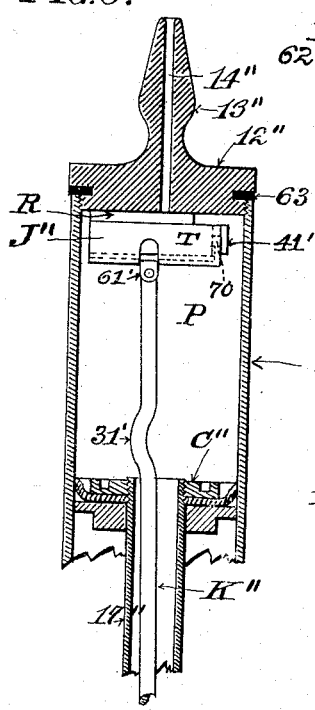

S. ROESNER.
SHUTTER OPERATING DEVICE FOR PHOTOGRAPHIC LENSES.
APPLICATION FILED SEPT. 28, 1910.
976,217.
Patented Nov. 22, 1910.
2 SHEETS—SHEET 1.
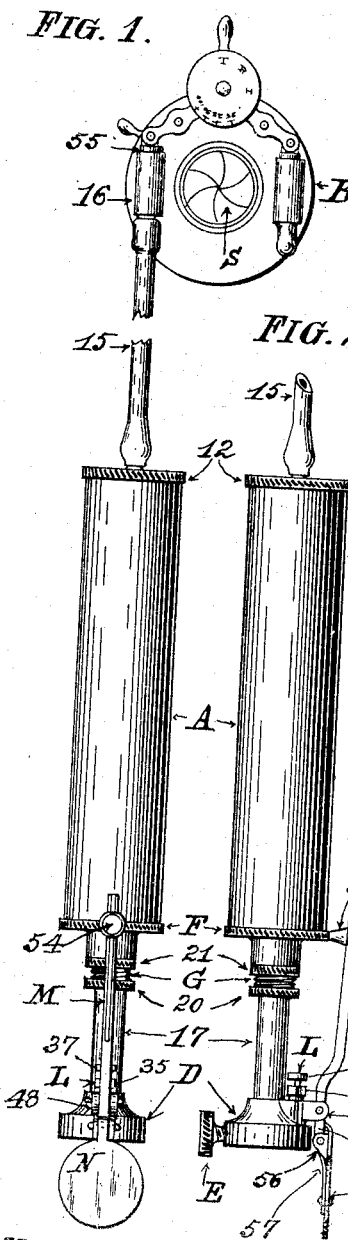
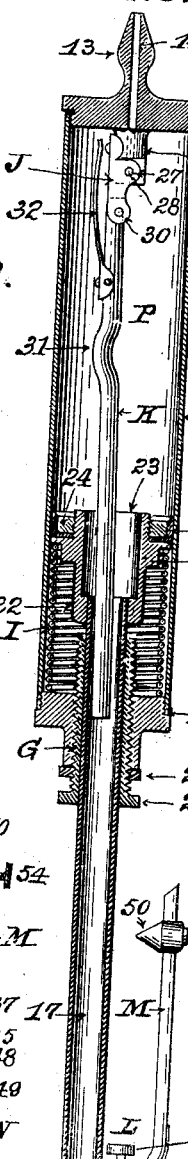
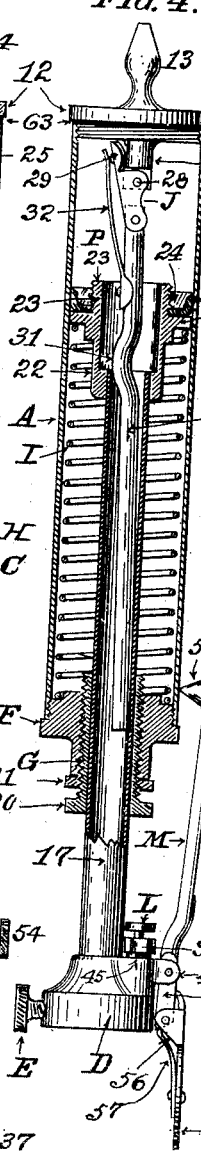
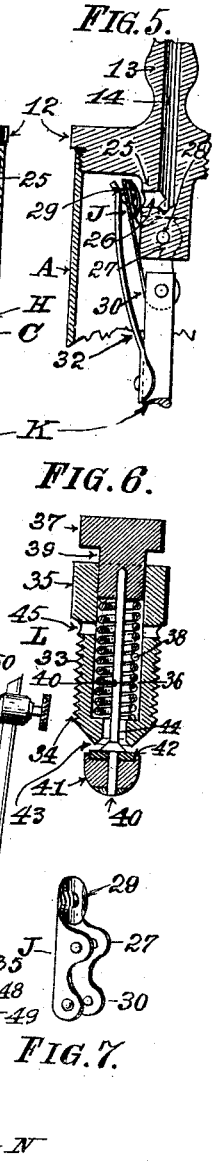
Witnesses:
C. R. Knudsen
A. S. Peterson
Inventor:
Siegmund Roesner,
By Michael J. Stark & Sons,
Attorneys.

S. ROESNER.
SHUTTER OPERATING DEVICE FOR PHOTOGRAPHIC LENSES.
APPLICATION FILED SEPT. 28, 1910.

976,217.

Patented Nov. 22, 1910.
2 SHEETS—SHEET 2.

Witnesses:
E. B. Knudsen
A. G. Peterson

Inventor:
Siegmund Roesner,
By Michael J. Starkr Sons,
Attorneys.

UNITED STATES PATENT OFFICE.

SIEGMUND ROESNER, OF CHICAGO, ILLINOIS.

SHUTTER-OPERATING DEVICE FOR PHOTOGRAPHIC LENSES.

976,217.   Specification of Letters Patent.   Patented Nov. 22, 1910.

Application filed September 28, 1910.   Serial No. 584,342.

*To all whom it may concern:*

Be it known that I, SIEGMUND ROESNER, a citizen of the United States, and resident of Chicago, in Cook county, Illinois, have invented certain new and useful Improvements in Shutter-Operating Devices for Photographic Lenses; and I do hereby declare that the following description of my said invention, taken in connection with the accompanying sheets of drawings, forms a full, clear, and exact specification, which will enable others skilled in the art to which my said invention appertains to make and use the same.

This invention has general reference to automatically-operating mechanism for actuating the shutter of photographic lenses; and it consists, essentially, in the novel and peculiar combination of parts and details of construction, as hereinafter first fully set forth and described, and then pointed out in the claims.

The object of this invention is the construction of automatically-operating means for actuating the usually iris diaphragms, or shutter, of photographic lenses, and at the same time provide for adjustably-arranged means whereby a visual signal is displayed at a predetermined time before the shutter is opened, to inform a person or group of persons, &c., the photograph of which is to be taken, that the exposure is soon to be made.

This device is designed to take the place of the usual rubber bulb which has heretofore been employed for the purpose of pneumatically actuating the shutter-operating means, and it is especially adapted to that class of photographic lenses which have means for producing what is technically known as "time," and "instantaneous" exposures. In this class of lenses means are provided whereby a single compression of the bulb forces a volume of air into a cylinder having a plunger which is connected with the shutter in such a manner that the latter is opened and instantly closed thereby producing an instantaneous exposure, while compressing the bulb and keeping it compressed opens the shutter and keeps it open until the bulb is released and permitted to expand, the time-exposure, or the time during which the shutter is kept open depending upon the operator and his keeping the bulb compressed. This latter operation is a tedious one and for taking dimly-lighted interiors, is practically impossible. It also frequently happens that the operator wishes to be "in the picture" and, therefore, has to step in front of the camera after the same has been focused, which requires a second operator to handle the bulb in making the exposure. All these various steps in making an exposure are automatically performed by my invention which is fully illustrated in the drawings already mentioned, and in which—

Figure 8:
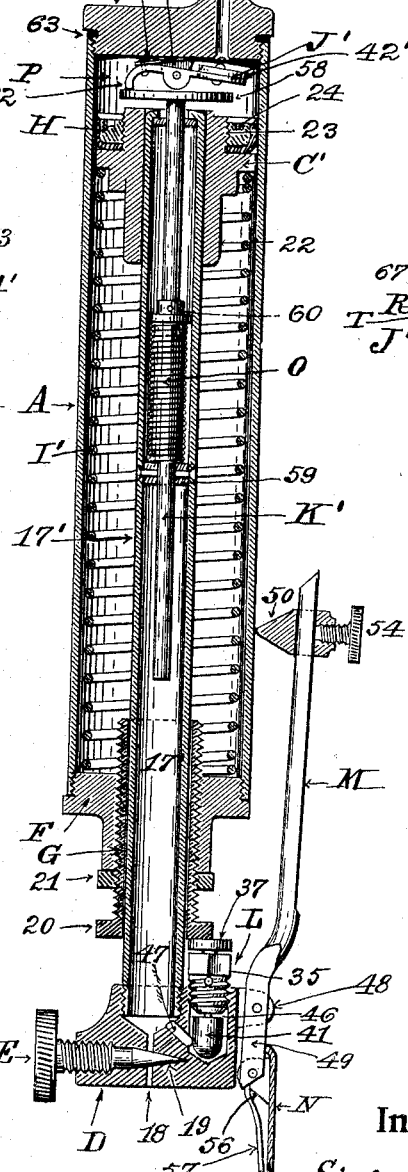
Figure 10:
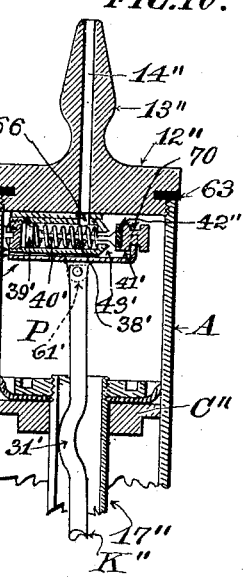
Figure 11:
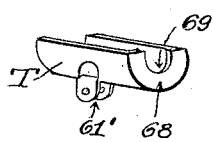

Figure 1 is a front view of a photographic lens to which my shutter-operating device is attached. Fig. 2 is a view similar to Fig. 1, the shutter-operating device being turned through an angle of 90 degrees, the lens being omitted. Fig. 3 is a longitudinal sectional elevation of the device and illustrating the position of the various parts at the moment that the device begins to operate. Fig. 4 is a like view showing the position of the parts at the time that an impulse is sent to the lens to open the shutter therein. Fig. 5 is a sectional view of a fragment of the device and illustrating the valve which permits air to pass from the cylinder to the shutter-actuating means on the lens, in open position. Fig. 6 is a sectional view of the auxiliary valve detached. Fig. 7 is a perspective view of the impulse-valve detached. Fig. 8 is a longitudinal sectional view of a modified form of construction of my present device. Figs. 9 and 10 are sectional views of a portion of the device and illustrating further modifications thereof. Fig. 11 is a perspective view of the slide which actuates the impulse-valve shown in Figs. 9 and 10.

Like symbols and characters of reference indicate the same or similar parts in all the various figures.

A, in the drawings designates a cylindrical shell of suitable diameter and length, which dimensions depend upon and are governed by the size of the lens to which this device is to be applied. This shell has at one end a head 12, preferably in screw-threaded engagement with said shell A, and from this head projects upwardly a nipple 13, the bore 14 of which communicates with the interior of the shell A. To this nipple there is attached a rubber tube 15, at one end, the other end of said tube being connected to the cylinder 16, of the lens B.

In the shell A there is located a piston C, which piston is secured to one end of a tubular piston-rod 17, the other end of said rod being in screw-threaded connection with a knob D, in the center of which there is a small orifice 18, which establishes communication between the interior of the tubular piston-rod 17 and the outer atmosphere. The effective area of this orifice is controlled by a thumb-screw E, having a needle-point 19, traversing said orifice 18, which needle point closes the orifice when screwed home and opens the same more or less when the thumb-screw is unscrewed.

The lower end of the shell A is closed by a bottom member F, screwed into the shell A. This bottom member has centrally a screw-tapped bore in which there is located an exteriorly screw-threaded sleeve G, engaging said tappet bore, the bore in said sleeve G being adapted to receive, and permit the tubular piston-rod 17 to slide therein. This tubular sleeve G has a knurled collar 20, by which it may be rotated, and a lock-nut 21, to lock the sleeve G in adjusted position.

The piston C already mentioned, comprises a body having a downwardly-projecting boss 22, in which the upper end of the tubular piston-rod is secured, and an upwardly-projecting, externally screw-threaded member 23, over which a leather cup H, is passed, said cup being secured to the piston by a lock-nut 24.

In the shell A, and interposed between the piston C and the bottom member F, there is located a spiral spring I, which is of such a length that it is capable of forcing the piston upwardly to within a short distance of the head 12, and still retain sufficient tension to maintain the piston against compressed air in said shell, as will hereinafter more fully appear.

From the inner surface of the cylinder-head 12, projects downwardly a boss 25, in which the bore 14 of the nipple 13 terminates. This bore has sidewise an opening 26, Fig. 5, which opening 26 is normally closed by a valve J, of peculiar construction and which valve I shall hereinafter term the "impulse-valve". This valve, as shown in Fig. 7 in perspective, comprises a preferably sheet metal stamping U-shaped in transverse section. It has two punctured lugs 27, by which, and a pin 28, it is pivoted to the boss 25, and an upper member faced with a leather disk 29, which is adapted to close the opening in the boss 25. This valve has two further lugs 30, to which is pivoted a rod K, which rod enters the bore of the piston rod 17, and in this rod K there is a kink or indentation 31, which performs the function of a cam or inclined plane to open and close the impulse-valve J in a manner to be further on described. Acting upon this impulse-valve J there is a blade-spring 32, which keeps this valve normally in closed position.

The knob D has at the side of the tubular piston-rod 17 an auxiliary valve L, shown in detail in Fig. 6, which auxiliary valve comprises a valve-casing 33, which is externally screw-threaded at 34, and terminates in a polygonal section 35, by which it may be screwed into the tapped bore 46 in said knob D. This body 33 has an internal bore 36, adapted to receive a push-button 37, and a spiral spring 38, which spring bears at one end in the bottom of the bore 36, and at its other end against the shank 39, of the push-button 37. Its function is to push the button upwardly. Centrally in this valve-casing there is located a rod 40, one end of which is secured in the shank 39, and the other end of which is fastened in a valve-body 41, in a recess in the face of which there is located a preferably leather washer or disk 42, which disk normally bears upon the tapering or beveled lower end 43 of the valve-casing 33 and thereby closes the lower end of a passage 44, in said valve-casing leading to the bore 36 therein, there being escape-openings 45, in said valve casing leading from its bore to the outer atmosphere. This auxiliary valve N connects, by a vein 47, with the bore of the tubular piston-rod 17, and through the latter with the interior of the cylinder A.

From the side of the knob D project two lugs 48, in spaced relation, in which lugs there is pivoted a lever M, to the lower short arm 49 of which is pivoted a disk N, the object of which is to serve as a target or visual signal when displayed. At the upper, long arm of the lever M there is adjustably secured a cone-shaped member 50, by means of a thumb-screw 54. This disk N lies normally against the lower face of the knob D, as illustrated in Fig. 3, its exposed position being shown in several of the remaining figures.

Having thus fully described the construction of this device, I shall now proceed to explain its operation.

The cylinder A with its appurtenants is attached to the cylinder 16 of the lens B by the preferably short tube 15. When it is desired to make an instantaneous exposure at a certain predetermined time, the shutter-operating mechanism on said lens is set for instantaneous operation. Now the cylinder A is taken in one hand by the operator and the knob D with its tubular piston-rod 17, and the piston C pulled until the spiral spring I is compressed and prevents further outward movement thereof. Releasing the knob D causes the spiral spring I to expand and to compress air drawn into the upper portion P, of the cylinder A past the piston-rod and the cup on the piston, no air, however escaping from said chamber P. When the camera has been suitably arranged for taking a picture, the needle-pointed screw E is slightly slackened to permit air to escape from the chamber P through the bore of the piston-rod 17 and the minute orifice 18, and the piston C to be moved upwardly in the cylinder A by the action of the spiral spring I, air-pressure being maintained thereby in the chamber P. As soon as the piston reaches the bend or kink 31 in the centrally-located rod K, this rod is deflected, which causes the hinged member J to move slightly upon its pivot 28 and to open the valve 29 and permit the compressed air in the chamber P to escape through the passage 26 and the hose 15 to the cylinder 16 on the lens B, and to force the plunger 55 therein to move upwardly and to operate the shutter S in said lens in the usual manner, the parts of my shutter-operating device at the moment when the impulse is sent to the lens B being shown in Fig. 4.

When it is desired to make a time-exposure, the shutter operating mechanism on the lens B is set accordingly, and the manipulation of my device as heretofore described repeated. However, after the piston has moved to the position shown in Fig. 4, and has sent an impulse to the lens-cylinder 16, the piston C continues its upward movement and keeps the air in the chamber P, and now also in the hose 15 and in the lens-cylinder 16, compressed. This impulse has caused the shutter S to be opened and the continuation or maintaining of the air-pressure in the chamber P causes the shutter to remain open, the piston in the meantime continuing to move upwardly and the displaced air in the chamber P to escape slowly through the orifice 18, until the button 37 of the auxiliary valve L strikes the collar 20 on the sleeve G, when this button will be depressed thereby causing the auxiliary valve to open and permitting the air in the chamber P to rush out of the same through the bore of the auxiliary valve body and the escape openings 45 therein. The air-pressure in the chamber P being thus reduced, the plunger in the lens-cylinder will drop, and the lens-shutter closed. It will now be observed that after the knob D has been pulled and released and the spring I has forced the piston C upwardly until the air-pressure in the chamber P equals the force exerted by the spiral spring I, the time required by the piston to move to a position where the impulse-valve J is opened, depends upon the effective area of the escape-orifice 18, and this effective area is regulated by the needle-pointed screw E which intercepts this orifice. This interval of time may be but a few seconds, or an hour in duration, but can be readily predetermined and the proper adjustment made by said screw E. It will be further observed that the interval of time elapsing between the opening of the shutter and its closing when making a time-exposure depends first upon the effective area of the orifice 18, and then upon the position of the revoluble sleeve G. Thus, moving this sleeve farther out of the bottom member F causes the button 37 of the auxiliary valve L to be sooner depressed than when the collar 20 on said sleeve G is nearer to the bottom member F, so that, when a very short time-exposure is required, this sleeve G is so far screwed out of the bottom member F that its collar 20 is in close proximity to the button 37 at the time when the impulse-valve has been opened. It will thus be noticed that after this shutter-actuating device has been set to commence its operation, the operator can withdraw from the camera and assume, if he so desires a position in front of the camera either alone or in a group before the exposure is made, ample time being afforded him before the shutter will open. As an instance of this nature, I may mention that I have taken a view in the Rocky Mountains where I had to place the camera on a promontory and walk quite a distance to an oppositely located point at which I desired to be photographed, which it required about 20 minutes to reach. I had set my exposing device to open the shutter in 30 minutes, and the exposure was made in due time and a good picture of the scenery in which I appear, was the result.

In order to give a visual signal of the approach of the time when the exposure will be made, so that the person or persons to be photographed may be ready and motionless, I have provided the target N, which normally lies close to the bottom of the knob D. When the cone 50 on the lever M reaches the bottom member F, this lever M is pushed slightly away from the cylinder A. This causes the incline 56 on the target N to contact with the lower edge of the button D and thereby to move the target from its horizontal position to a vertical one, this movement being assisted by a blade-spring 57 secured to said target N. The time in which this signal is to be given before the exposure takes place is regulated by moving the cone 50 nearer to, or farther away from, the end of the lever M. Thus in Fig. 2, the position of the cone 50 is shown at the moment when it has mounted the cylinder A and has thrown the target to view, while in Fig. 4 the position is shown where the impulse-valve opens, the cone 50 having moved with the piston from the position shown in Fig. 2 to that shown in Fig. 4, the time required for the cone to move this distance being the interval of time elapsing between the displaying of the target and the opening of the shutter, and which interval may be only a few seconds or as many minutes, depending upon the position of the cone 50 on the lever M.

I have heretofore described the preferred embodiment of my invention as disclosed in Figs. 1 to 7 inclusive, but in Figs. 8 to 11 inclusive, I have illustrated several modified forms of construction of this device.

As shown in Fig. 8, I locate in the tubular piston-rod 17′ a straight rod K′, and have provided this rod at its upper end with a button 58. Upon this rod there is a collar 60, and in the bore of the piston-rod 17′ there is an abutment-collar 59, a spiral spring O, being interposed between these collars to keep the button 58 normally above the piston C′. On the under surface of the head 12′ I provide lugs 61, in which a slightly modified form of impulse-valve J′ is pivoted, the preferably leather disk of which, (42′) is adapted to normally close the passage 14′ in the nipple 13′, which nipple in this instance is placed at the side of the center of the cylinder head 12′. This impulse-valve J′ has a downwardly-turned member 62, wherewith the disk or button 58 contacts when the piston C′ reaches the position shown in Fig. 4, and thereby opens the impulse-valve, said valve being held in normally closed position by a spring 32′. As the piston C′ moves farther upward, the disk 58 will keep the impact-valve J′ in open position, but the spring O in the piston-rod will be compressed, this spring being, however considerably weaker than the spring I′ so as not to interfere with the action of said spring I′.

In Figs. 9, 10, and 11, I have illustrated a further modification of my invention. In this instance I employ a kinked rod K″ the same as the kinked rod in the preferred embodiment of this invention, but instead of the impulse-valve J, I employ one, J″, similar to the escape-valve L shown in Figs. 3, 6, and 8, said impulse-valve J″ comprising a horizontally-located barrel R of cylindrical contour secured to the under side of the head 12″, said barrel having a passage 66 leading from said barrel to the egress-passage 14″ in the nipple 13″. One of the ends of this barrel is plugged by a head 67, while the other end thereof is formed to a tapering valve-seat 43′. In this barrel there is a piston 39′ to which is secured a rod 40′ at one of its ends, the other end being secured to a valve-body 41′, having a preferably leather disk 42″, adapted to seat upon the tapering valve-seat 43′. In this barrel R, and upon the rod 40′ there is a spiral spring 38′, acting upon the piston 39′ in such manner as to keep the valve 41′ normally seated upon its seat 43′. Upon the outer surface of the barrel R there is movably located a slide T, said slide being an approximately semi-circular shell open at one end, the opposite end being formed into a crescent-shaped head 68, the semi-circular incision 69 therein being adapted to engage a neck 70, formed in the valve-body 41′. On the shell T there are provided two punctured lugs 61′ wherewith the upper end of the rod K″ engages. When the piston C″ reaches the kink 31′ in the rod K″, it will push this rod slightly aside so that the crimped part thereof may enter the bore of the piston-rod 17″ and thereby move the shell T, together with the valve 41′, laterally, thus opening the said valve and permitting air to rush from the chamber P to the lens-cylinder in the same manner as heretofore described with reference to the impulse-valves J or J′.

These modifications of the construction of my invention as well as others which may be resorted to by persons skilled in the art to which this invention appertains may be adopted if desired, without departing from the scope of my invention.

In order that the chamber T may be tightly closed where the head 12 is inserted in the cylinder A, I provide an elastic washer or packing 63, between the adjoining parts, as shown in black line in Figs. 3, 4, 5, 8, 9, and 10. This precaution is not required at the lower end of the cylinder A, for obvious reasons.

Having thus fully described this invention I claim as new and desire to secure to me by Letters Patent of the United States—

1. An automatic timer for photographic lens-shutters, comprising, in combination, a cylinder, a piston in said cylinder, a tubular piston-rod to which said piston is attached, means in said cylinder adapted to move said piston in one direction only, an impulse-valve in said cylinder, and a rod in said tubular piston-rod, said rod being provided with means which will open said impulse-valve when said piston reaches a predetermined position in said cylinder, and to keep said impulse-valve in open position during the remainder of the stroke of said piston.

2. An automatic timer for photographic lens-shutters, comprising, in combination, a cylinder, a piston in said cylinder, a tubular piston-rod to which said piston is attached, a spring in said cylinder adapted to move said piston in one direction only, an impulse-valve in said cylinder, a rod in the bore of said piston-rod, said rod being adapted to open said impulse-valve when said piston reaches a predetermined position in said cylinder and to keep said impulse-valve open during the remainder of the stroke of said piston, a discharge-orifice leading from said tubular piston-rod to the outer atmosphere, means adapted to govern the effective area of said discharge-orifice, and an auxiliary valve adapted to open when said piston approaches the end of its stroke.

3. In an automatic timer for photographic lens-shutters, the combination, of a cylinder, a piston in said cylinder, a tubular piston-rod to which said piston is attached, means adapted to move said piston in one direction only, an impulse-valve adapted to open when said piston reaches a predetermined position in said cylinder, and means adapted to open said impulse-valve and to keep the same open during the remainder of the stroke of said piston, said latter means including a rod in the bore of said piston-rod, there being a kink in said rod adapted to contact with the bore in said piston, one end of said rod being pivoted to said impulse-valve.

4. A timer for photographic lens-shutters, comprising, in combination, a cylinder, a piston in said cylinder, a tubular piston-rod to which said piston is attached, means in said cylinder adapted to move said piston in one direction only, an escape passage leading from said cylinder to the shutter-operating means on said lens, an impulse-valve adapted to open said passage when said piston reaches a predetermined position in said cylinder and to keep said passage open during the remainder of the stroke of said piston, said means for opening said impulse-valve including a kinked rod located in said tubular piston rod and connected pivotally to said impulse-valve.

5. A timer for photographic lens-shutters, comprising, in combination, a cylinder, a piston in said cylinder, a tubular piston-rod to which said piston is attached, means adapted to move said piston in one direction only to compress air in said cylinder, an escape-orifice at the outer end of said tubular piston-rod, means adapted to vary the effective area of said escape-orifice, an impulse-valve adapted to open when said piston reaches a predetermined position in said cylinder and to remain open during the remainder of the stroke of said piston, a kinked rod in the bore of said piston-rod, said kinked rod being pivotally connected to said impulse-valve, an auxiliary valve at the outer end of said tubular piston rod and independent of the same, a passage leading from the bore of said piston-rod to said auxiliary valve, and adjustable means adapted to open said auxiliary valve when said piston approaches the end of its stroke.

6. In an automatic timer for photographic lens-shutters, comprising in combination, a cylinder, a piston in said cylinder, a tubular piston-rod to which said piston is attached, means adapted to move said piston in one direction only, an impulse-valve adapted to open when said piston reaches a predetermined position in said cylinder, and an auxiliary valve at the outer end of said piston-rod adapted to open when said piston approaches the end of its stroke, said auxiliary valve being located at the side of said tubular piston rod and having a communicating passage with the bore of said piston-rod, said auxiliary valve having a button adapted to contact with an adjustable abutment, as set forth.

7. In an automatic timer for photographic lens-shutters, comprising, in combination, a cylinder, a piston in said cylinder, a tubular piston-rod to which said piston is attached, means in said cylinder adapted to move said piston in one direction only, a bottom-member on said cylinder, a screw-threaded sleeve in said bottom-member, a knob at the outer end of said tubular piston-rod, and an auxiliary valve located at the side of said tubular piston-rod in said knob, said auxiliary valve comprising a valve-casing, a button having a shank movable in said valve-casing, a valve at the lower end of said valve-casing, a rod connecting said shank to said valve, and a spring in said valve-casing adapted to keep said valve normally seated against the end of said valve-casing, said button being adapted to contact with said sleeve to open said valve.

8. In an automatic timer for photographic lens-shutters, the combination, of a cylinder, a piston in said cylinder, a piston-rod to which said piston is attached, means in said cylinder to actuate said piston, an impulse-valve adapted to open when said piston reaches a predetermined position, and means adapted to indicate visually the position of said piston prior to its opening the impulse-valve, said latter means including a pivoted lever, a target pivoted to said lever, and means on said lever adapted to move said lever when reaching said cylinder.

9. In an automatic timer for photographic lens-shutters, the combination, of a cylinder, a piston in said cylinder, a piston-rod to which said piston is attached, means adapted to move said piston, an impulse-valve adapted to open when said piston reaches a predetermined position in said cylinder, and means adapted to indicate visually, the approach of said piston to the position when said impulse-valve opens, said latter means including a lever pivoted at the lower end of said piston-rod, a target pivotally connected to said lever, an incline on said target adapted to contact with the lower end of said piston-rod, a spring on said target, and a cone on the long arm of said lever, said cone being movably secured to said long arm and adapted to contact with the lower end of said cylinder.

In testimony that I claim the foregoing as my invention I have hereunto set my hand in the presence of two subscribing witnesses.

SIEGMUND ROESNER.

Witnesses:
MICHAEL J. STARK,
CHAS. S. BARKER.